United States Patent
Wang et al.

(10) Patent No.: US 10,969,615 B2
(45) Date of Patent: Apr. 6, 2021

(54) ELECTRONIC DISPLAY ASSEMBLY

(71) Applicant: DynaScan Technology Corp., Taoyuan Hsien (TW)

(72) Inventors: Tsun-I Wang, Taoyuan Hsien (TW); Ching-Chun Wu, Taoyuan Hsien (TW); Chia-Liang Yang, Taoyuan Hsien (TW)

(73) Assignee: DYNASCAN TECHNOLOGY CORP., Taoyuan (TW)

( * ) Notice: Subject to any disclaimer, the term of this patent is extended or adjusted under 35 U.S.C. 154(b) by 0 days.

(21) Appl. No.: 16/790,396

(22) Filed: Feb. 13, 2020

(65) Prior Publication Data
US 2020/0285099 A1    Sep. 10, 2020

Related U.S. Application Data

(63) Continuation-in-part of application No. 16/363,148, filed on Mar. 25, 2019, now Pat. No. 10,754,184.

(30) Foreign Application Priority Data

Jul. 4, 2018    (TW) .................................. 107123025

(51) Int. Cl.
*G02F 1/1333* (2006.01)
*G02F 1/13357* (2006.01)
*G02F 1/1335* (2006.01)

(52) U.S. Cl.
CPC .. *G02F 1/133385* (2013.01); *G02F 1/133308* (2013.01); *G02F 1/133603* (2013.01); *G02F 1/133628* (2021.01)

(58) Field of Classification Search
None
See application file for complete search history.

(56) References Cited

U.S. PATENT DOCUMENTS

| 5,991,153 A | * | 11/1999 | Heady | ..................... H05K 7/202 |
|---|---|---|---|---|
| | | | | 165/185 |
| 8,274,622 B2 | | 9/2012 | Dunn | |
| 8,482,695 B2 | | 7/2013 | Dunn | |

(Continued)

FOREIGN PATENT DOCUMENTS

EP    1647766 A2    4/2006

OTHER PUBLICATIONS

European Search Report dated Jun. 24, 2020 for related EP Application No. 19000580.1. pp. 1-8.

*Primary Examiner* — Ryan Crockett
(74) *Attorney, Agent, or Firm* — Duane Morris LLP (57) ABSTRACT

An electronic display assembly is provided. The electronic display assembly comprises a backlight module, a transparent plate, a liquid crystal panel, an internal heat exchange path and an external heat dissipation path with ambient air flowing through. The liquid crystal panel is disposed between the transparent plate and the backlight module. The internal heat exchange path comprises a first pathway, a second pathway and a third pathway. The first pathway is arranged between the transparent plate and the liquid crystal panel. The second pathway is arranged between the liquid crystal panel and backlight module. The third pathway is located directly behind the backlight module. The external heat dissipation path carries heat conducted from air flowing through the third pathway.

11 Claims, 9 Drawing Sheets

(56) References Cited

U.S. PATENT DOCUMENTS

| | | |
|---|---|---|
| 8,854,572 B2 | 10/2014 | Dunn |
| 9,089,079 B2 | 7/2015 | Dunn |
| 9,370,127 B2 | 6/2016 | Dunn |
| 9,629,287 B2 | 4/2017 | Dunn |
| 2005/0140843 A1* | 6/2005 | Shimizu ................ G09F 19/228 349/58 |
| 2008/0285290 A1* | 11/2008 | Ohashi ................ G02B 6/0085 362/373 |
| 2010/0188596 A1* | 7/2010 | Juan ................ G02F 1/133308 349/58 |
| 2011/0001898 A1* | 1/2011 | Mikubo ............ H05K 7/20972 349/58 |
| 2011/0013114 A1* | 1/2011 | Dunn ................ G02F 1/133385 349/61 |
| 2011/0085301 A1* | 4/2011 | Dunn ................ H05K 7/20972 361/695 |
| 2012/0012300 A1* | 1/2012 | Dunn ................ G05D 23/1934 165/287 |
| 2014/0111940 A1 | 4/2014 | Dunn |
| 2014/0268657 A1* | 9/2014 | Dunn ................ G02F 1/133603 362/97.2 |
| 2014/0345834 A1* | 11/2014 | Dunn ................ G02F 1/133385 165/120 |
| 2018/0088368 A1* | 3/2018 | Notoshi ............ G02B 6/0068 |
| 2018/0259806 A1* | 9/2018 | Oh .................... G02F 1/133385 |
| 2018/0317350 A1* | 11/2018 | Dunn ................ H05K 7/20972 |
| 2019/0182981 A1* | 6/2019 | Huang ............ H05K 7/20972 |
| 2019/0289754 A1* | 9/2019 | Hubbard ............ H05K 7/20972 |
| 2020/0118472 A1* | 4/2020 | Wang ................ G02F 1/13318 |

* cited by examiner

ELECTRONIC DISPLAY ASSEMBLY

BACKGROUND

1. Field of the Disclosure

The present disclosure relates to an electronic display assembly. More particularly, the present disclosure relates to an electronic display assembly with high heat dissipation efficiency.

2. Description of the Related Art

As display apparatuses are widely used in different environments, how to ensure the reliability and robustness of display apparatuses under harsh conditions has become an important issue. For example, if a display apparatus is placed outdoors, the irradiation of sunlight may cause the temperature of the display apparatus to rise rapidly. The heat accumulated in the internal space of the display apparatuses will affect the normal functions of the electronic components. For example, the electronic components may have a reduced life even breakdown due to the temperature rise in the internal space of the display apparatuses. Additionally, for the optical components (e.g., liquid crystal layer or optical films), problems such as liquefaction or yellowing of the liquid crystal may occur if the temperature inside the display device is too high.

SUMMARY

In view of the above, there is a need to provide a display apparatus with high heat dissipation efficiency, so as to ensure that the display apparatus is functioning properly and to make the display apparatus have a longer lifetime.

In one aspect according to some embodiments, an electronic display assembly is provided. The electronic display assembly includes a backlight module, a transparent plate, a liquid crystal panel, an internal heat exchange path and an external heat dissipation path with ambient air flowing through. The liquid crystal panel is disposed between the transparent plate and the backlight module. The internal heat exchange path includes a first pathway, a second pathway and a third pathway. The first pathway is arranged between the transparent plate and the liquid crystal panel. The second pathway is arranged between the liquid crystal panel and backlight module. The third pathway is located directly behind the backlight module. The external heat dissipation path carries heat conducted from air flowing through the third pathway.

In a preferred embodiment, the third pathway and the external heat dissipation path together form a heat exchanger with at least two channels.

In a preferred embodiment, the direction of an internal air flow flowing through the third pathway is substantially parallel with the direction of the ambient air flow flowing through the external heat dissipation path.

In a preferred embodiment, an optical film is disposed between the liquid crystal panel and the backlight module, and the second pathway is arranged between the liquid crystal panel and the optical film.

In a preferred embodiment, an optical film is disposed between the liquid crystal panel and the backlight module, and the second pathway is arranged between the optical film and the backlight module.

In a preferred embodiment, an optical film is disposed between the liquid crystal panel and the backlight module. The internal heat exchange path further comprises a fourth pathway, and the second pathway is arranged between the liquid crystal panel and the optical film and the fourth pathway is arranged between the optical film and the backlight module.

Other aspects and embodiments of the present disclosure are also contemplated. The foregoing summary and the following detailed description are not meant to limit the present disclosure to any particular embodiment but are merely meant to describe some embodiments of the present disclosure.

BRIEF DESCRIPTION OF THE DRAWINGS

For a better understanding of the nature and objects of some embodiments of the present disclosure, reference should be made to the following detailed description taken in conjunction with the accompanying drawings. In the drawings, identical or functionally identical elements are given the same reference numbers unless otherwise specified.

DETAILED DESCRIPTION

The present disclosure provides for an electronic display assembly. Embodiments of electronic display assembly described herein bring the high temperature air flow in the housing to the internal portion of the heat exchanger. The ambient air flow in the external environment passes through the external portion of the heat exchanger. Due to heat exchange between the internal portion and the external portion, heat generated by the backlight module or heat accumulated in the internal space of the electronic display assembly under sunlight exposure is transferred to outside via the heat exchanger, thereby reducing the temperature of the electronic display assembly. The designs of the multiple pathways within the electronic display assembly allow heat to dissipate faster. Moreover, the design of non-connection between the internal portion and the external portion of the heat exchanger is favorable for preventing moisture and dust existed in the external environment from entering into the housing, and thus the electronic display assembly is suitable for outdoor use.

Figure 1:
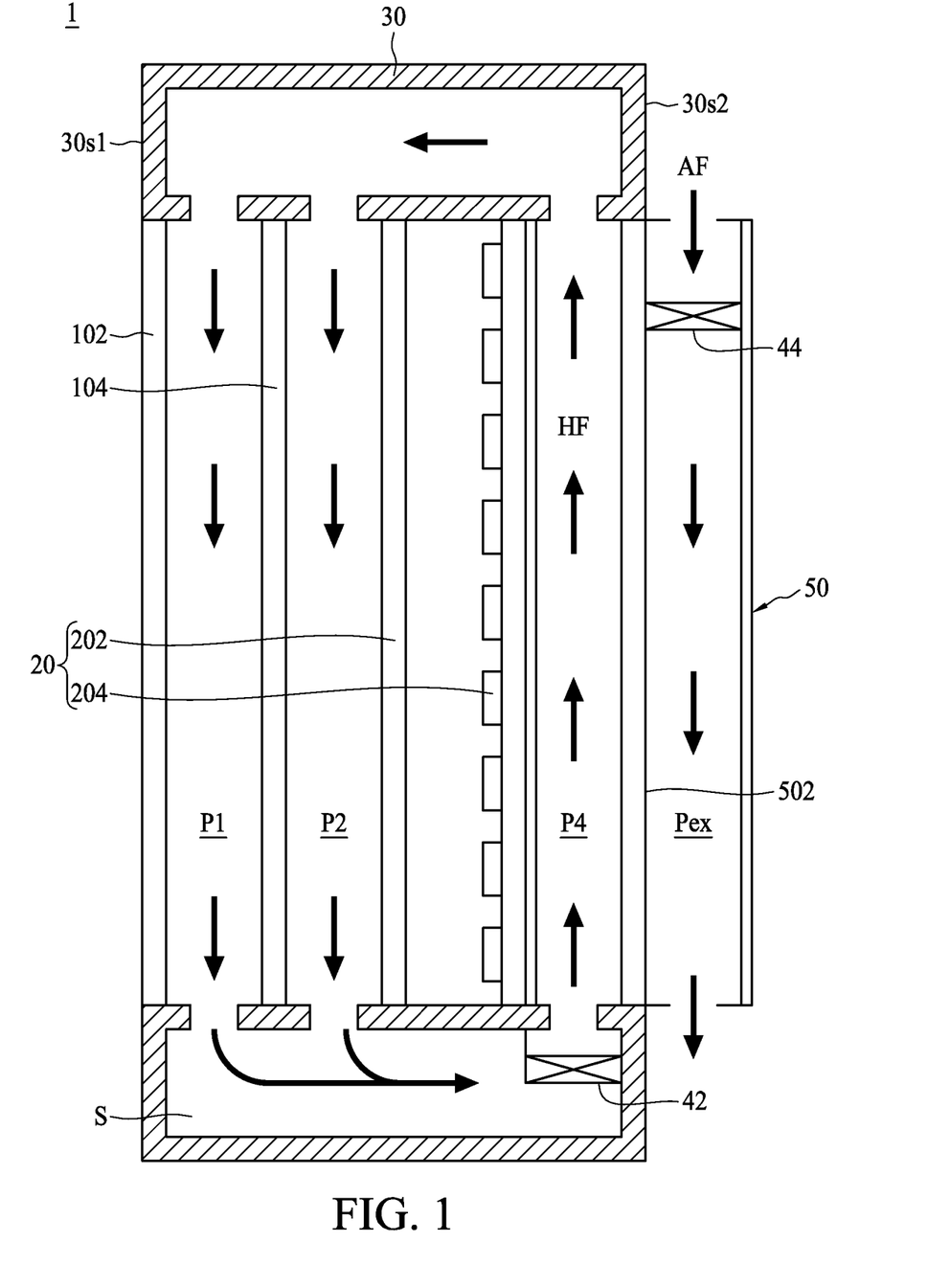
FIG. 1 is a cross-sectional view of an electronic display assembly according to some embodiments of the present disclosure.

FIG. 1 is a cross-sectional view of an electronic display assembly according to some embodiments of the present disclosure. As shown in FIG. 1, an electronic display assembly 1 includes a transparent plate 102, a liquid crystal layer 104, a backlight module 20, a housing 30, a flow generator 42 and a heat exchanger 50. The transparent plate 102 is disposed in the displaying opening of the front portion 30s1 of the housing 30. The liquid crystal layer 104 is disposed between the transparent plate 102 and the backlight module 20. The backlight module 20 is disposed between the display unit 10 and the heat exchanger 50. The backlight module 20 may include an optical film 202 and a circuit board with one or more light sources 204 thereon. The light sources 204 can be, for example, a plurality of LEDs to provide backlight illumination for the display unit 10. The optical film 202 can be, for example, a light diffuser, a light reflector or a brightness enhancement film, or a combination of two or more thereof.

The electronic display assembly 1 includes an internal heat exchange path Pin and an external heat dissipation path Pex. The ambient air flow AF flows through the external heat dissipation path Pex. In this embodiment, the internal heat exchange path Pin includes a pathway P1, a pathway P2 and a pathway P4. The pathway P1 is arranged between the transparent plate 102 and the liquid crystal panel 104. The pathway P2 is arranged between the liquid crystal panel 104 and backlight module 20. That is, an internal air flow is enabled to pass through both of the front and back sides of the liquid crystal panel 104 via pathways P1 and P2, respectively. The pathway P4 is arranged directly behind the backlight module 20. Specifically, the pathway P4 is configured to be adjacently attached to a surface away from the light sources 204. The pathways P1, P2 and P4 is fluidly connected with an accommodation space S within the housing 30; that is, an internal air flow is enabled to pass through the accommodation space S and the pathways P1, P2 and P4 of the internal heat exchange path Pin.

The electronic display assembly 1 includes a flow generator 42. The flow generator 42, for example, is a fan disposed in the accommodation space S of the housing 30 and configured to generate an internal air flow flowing through the pathways P1, P2, P4 and the accommodation space S so as to form an internal circulating airflow. It is worth noting that the number of the flow generator 42 is not limited in view of embodiments in the present disclosure.

The electronic display assembly 1 further includes another flow generator 44. The flow generator 44, for example, is a fan for generating an ambient air flow through the external heat dissipation path Pex, so as to bring the heat conducted by the heat exchanger 50 to the environment.

The heat exchanger 50 is disposed in the mounting opening of the rear portion 30s2 of the housing 30. The pathway P4, the external heat dissipation path Pex and the thermal conductive portion 502 together form the heat exchanger 50. The thermal conductive portion 502 is, for example, a metal plate made of aluminum. It is worth noting that any air flow in the pathway P4 is independent from the ambient air flow AF in the external heat dissipation path Pex.

An internal portion of the heat exchanger 50 is disposed in the accommodation space S. The inner side surface of the heat exchanger 50 is attached to the back side of the backlight module 20, such that the backlight module 20 is in thermal contact with the heat exchanger 50. The pathway P4 of the heat exchanger 50 is connected with the accommodation space S, such that the air flow generated by the flow generator 42 in the housing 30 is enabled to pass through the pathway P4 of the heat exchanger 50. An external portion of the heat exchanger 50 protrudes out of the rear portion 30s2 of the housing 30 from the mounting opening, and the external heat dissipation path Pex are fluidly connected with the external environment. In this embodiment, since the housing 30 insulates the pathway P4 from the external environment and a non-connection is provided between the pathway P4 and the external heat dissipation path Pex, the ambient air flow AF is unable to flow into the pathway P4, and the air flow in the housing 30 is unable to flow out to the external heat dissipation path Pex.

The heat exchanger 50 according to this embodiment is favorable for dissipating heat accumulated in the electronic display assembly 1, so as to reduce the temperature within the electronic display assembly 1. Heat accumulated in the electronic display assembly 1 mainly comes from two ways; one way is heat generated under sunlight exposure, and the other way is heat generated by the light sources 204 of the backlight module 20 and/or other electronic components in the electronic display assembly 1. As shown in FIG. 1, the flow generator 42 generates an air flow flowing through the pathway P4. And, the air flow flows through the accommodation space S within the housing 30 and through the pathways P1 and P2. It is clear from FIG. 1 that the air flow generated by the flow generator 42 forms an internal circulating airflow. In detail, heat generated by the sunlight incident on the transparent plate 102 and the liquid crystal layer 104 can be transferred to the air in the pathways P1 and P2. By a characteristic of heat transfer from high temperature to low temperature during heat exchange or force of the flow generator 42, the high temperature air flow HF moves from the pathways P1 and P2 to the pathway P4 of the heat exchanger 50 through the accommodation space S, thereby achieving internal circulating airflow. Due to the connection between the pathway P4 of the heat exchanger 50 and the pathways P1 and P2 along the front and back sides of the liquid crystal layer 104, the high temperature air flow HF caused by sunlight flows among the pathways P1 and P2 and the pathway P4 of the heat exchanger 50.

The ambient air flow AF (such as cold air) flows in the external heat dissipation path Pex of the heat exchanger 50. The high temperature air flow HF in the pathway P4 raises the temperature of the internal portion of the heat exchanger 50, and the ambient air flow AF in the external heat dissipation path Pex reduces the temperature of the external portion of the heat exchanger 50. Therefore, due to the thermal contact between the internal portion and the external portion of the heat exchanger 50 via the thermal conductive portion 502, heat generated by the sunlight and/or the backlight module 20 of the electronic display assembly 1 is transferred to the external environment through the heat exchanger 50, thereby reduce the temperature of the electronic display assembly 1.

It is noted that heat generated by the sunlight incident on the transparent plate 102 and the liquid crystal layer 104 or heat generated by the light sources 204 of the backlight module 20 or heat generated by other electronic components are accumulated in the electronic display assembly 1. The heat exchanger 50 is mainly configured to dissipate heat accumulated in the component(s) of the electronic display assembly 1. In this embodiment, the heat exchanger 42 equipped with the flow generator 42 is used for heat dissipation of the display unit 10 and the backlight module 20 so as to reduce the overall temperature of the electronic display assembly 1. It should be noted that because there are two air pathways on the front and back sides of the liquid crystal layer 104, the heat accumulated by the sunlight on the display unit 10 can be quickly guided to the internal portion of the heat exchanger 50. Due to the thermal contact between the internal portion and the external portion of the heat exchanger 50 via the thermal conductive portion 502, the overall temperature of the electronic display assembly 1 can be reduced.

Figure 2:
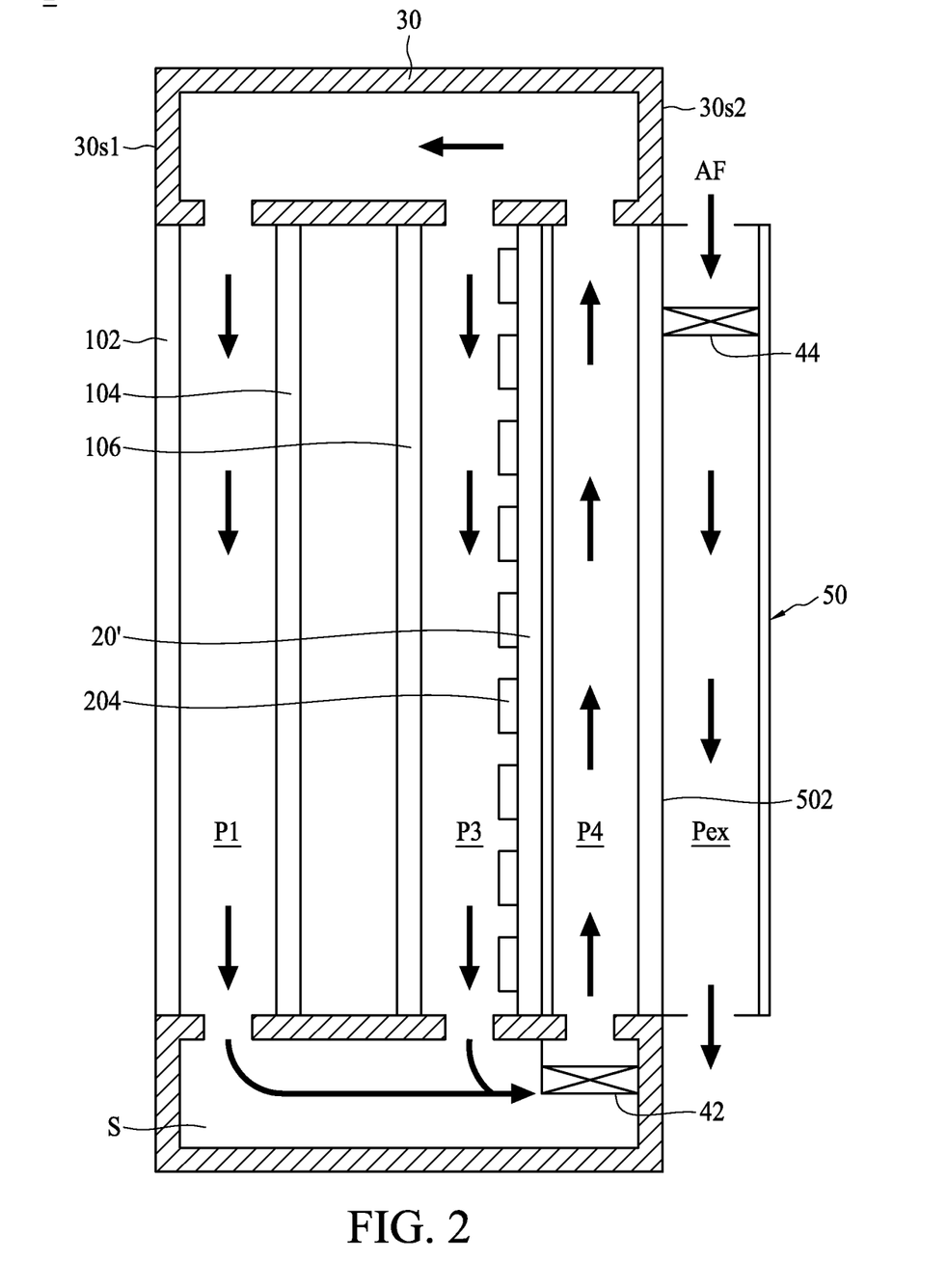
FIG. 2 is a cross-sectional view of an electronic display assembly according to some embodiments of the present disclosure.

FIG. 2 is a cross-sectional view of an electronic display assembly according to some embodiments of the present disclosure. As shown in FIG. 2, the electronic display assembly 2 includes a transparent plate 102, a liquid crystal layer 104, an optical film 106, a backlight module 20', a housing 30, a flow generator 42 and a heat exchanger 50. The transparent plate 102 is disposed in the displaying opening of the front portion 30s1 of the housing 30. The liquid crystal layer 104 is disposed between the transparent plate 102 and the optical film 106. The backlight module 20' is disposed between the optical film 106 and the heat exchanger 50. The backlight module 20' may include a PCB circuit board with one or more light sources 124 thereon. The light sources 124 are disposed on a front side of the backlight module 20' (i.e., facing toward to the liquid crystal layer 104).

The electronic display assembly 2 includes an internal heat exchange path Pin and an external heat dissipation path Pex. The ambient air flow AF flows through the external heat dissipation path Pex. In this embodiment, the internal heat exchange path Pin includes a pathway P1, a pathway P3 and a pathway P4. The pathway P1 is arranged between the transparent plate 102 and the liquid crystal panel 104. The pathway P3 is arranged between the optical film 106 and the backlight module 20'. The pathway P4 is arranged directly behind the backlight module 20. Specifically, the pathway P4 is attached to a back side of the backlight module 20'. The pathways P1, P3 and P4 are fluidly connected with an accommodation space S within the housing 30; that is, an internal air flow is enabled to pass through the accommodation space S and the pathways P1, P3 and P4 of the internal heat exchange path Pin.

The electronic display assembly 2 further includes a flow generator 42. The flow generator 42, for example, is a fan disposed in the accommodation space S of the housing 30 and configured to generate an internal air flow flowing through the pathways P1, P3, P4 and the accommodation space S so as to form an internal circulating airflow. It is worth noting that the number of the flow generator 42 is not limited in view of embodiments in the present disclosure.

The electronic display assembly 2 further includes another flow generator 44. The flow generator 44, for example, is a fan for generating an ambient air flow through the external heat dissipation path Pex, so as to bring the heat conducted by the heat exchanger 50 to the environment.

The heat exchanger 50 is disposed in the mounting opening of the rear portion 30s2 of the housing 30. The pathway P4, the external heat dissipation path Pex and the thermal conductive portion 502 together form the heat exchanger 50. The thermal conductive portion 502 is, for example, a metal plate made of aluminum. It is worth noting that any air flow in the pathway P4 is independent from the ambient air flow AF in the external heat dissipation path Pex.

An internal portion of the heat exchanger 50 is disposed in the accommodation space S. The inner side surface of the heat exchanger 50 is attached to the back side of the backlight module 20', such that the backlight module 20' is in thermal contact with the heat exchanger 50. The pathway P4 of the heat exchanger 50 is connected with the accommodation space S, such that the air flow generated by the flow generator 42 in the housing 30 is enabled to pass through the pathway P4 of the heat exchanger 50. An external portion of the heat exchanger 50 protrudes out of the rear portion 30s2 of the housing 30 from the mounting opening, and the external heat dissipation path Pex are fluidly connected with the external environment. In this embodiment, since the housing 30 insulates the pathway P4 from the external environment and a non-connection is provided between the pathway P4 and the external heat dissipation path Pex, the ambient air flow AF is unable to flow into the pathway P4, and the air flow in the housing 30 is unable to flow out to the external heat dissipation path Pex.

The heat exchanger 50 according to this embodiment is favorable for dissipating heat accumulated in the electronic display assembly 2, so as to reduce the temperature within the electronic display assembly 2. Heat accumulated in the electronic display assembly 2 mainly comes from two ways; one way is heat generated under sunlight exposure, and the other way is heat generated by the light sources 204 of the backlight module 20' and/or other electronic components in the electronic display assembly 2. As shown in FIG. 2, the flow generator 42 generates an air flow flowing through the pathway P4. And, the air flow flows through the accommodation space S within the housing 30 and through the pathways P1 and P3. It is clear from FIG. 2 that the air flow generated by the flow generator 42 forms an internal circulating airflow. In detail, heat generated by the sunlight incident on the transparent plate 102 can be transferred to the air in the pathway P1. Additionally, heat generated by the backlight module 20' and/or other electronic components may be transferred to the pathways P3 and P4. Due to the connection among the pathway P4 of the heat exchanger 50, the pathway P1 along the front side of the liquid crystal layer 104, and the pathway P3 along the front side of the backlight module 20', the high temperature air flow HF flows among the pathways P1, P3 and P4.

The ambient air flow AF (such as cold air) flows in the external heat dissipation path Pex of the heat exchanger 50. The high temperature air flow HF in the pathway P4 raises the temperature of the internal portion of the heat exchanger 50, and the ambient air flow AF in the external heat dissipation path Pex reduces the temperature of the external portion of the heat exchanger 50. Therefore, due to the thermal contact between the internal portion and the external portion of the heat exchanger 50 via the thermal conductive portion 502, heat accumulated in the electronic display assembly 2 is transferred to the external environment through the heat exchanger 50, thereby reduce the temperature of the electronic display assembly 2.

It should be noted that compared with the electronic display assembly 2 shown in FIG. 2, the heat generated by the sunlight incident on the display unit 10 of the electronic display assembly 1 shown in FIG. 1 can be dissipated more quickly because there are two air pathways on the front and back sides of the liquid crystal layer 104. On the other hand, compared with the electronic display assembly 1 shown in FIG. 1, the heat generated by the light sources 204 of backlight module 20' of the electronic display assembly 2 shown in FIG. 2 can be dissipated more quickly because there are two air pathways on the front and back sides of the light sources 204 of the backlight module 20'.

Figure 3:
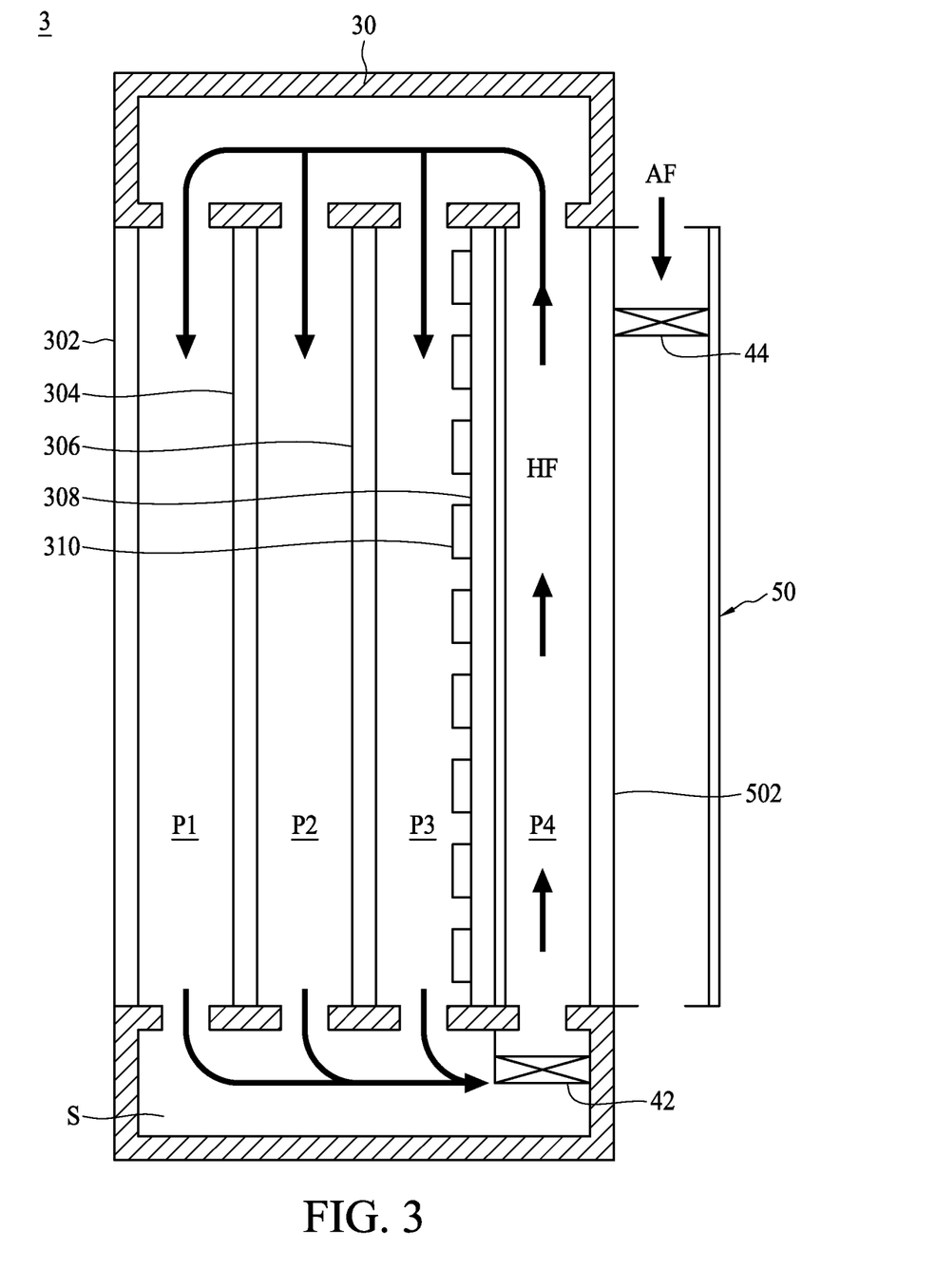
FIG. 3 is a cross-sectional view of an electronic display assembly according to some embodiments of the present disclosure.

FIG. 3 is a cross-sectional view of an electronic display assembly according to some embodiments of the present disclosure. As shown in FIG. 3, the electronic display assembly 3 includes a transparent plate 302, a liquid crystal layer 304, an optical film 306, a backlight module 308, a housing 30, a flow generator 42 and a heat exchanger 50.

The transparent plate 302 is disposed in the displaying opening of the front portion 30s1 of the housing 30. The liquid crystal layer 304 is disposed between the transparent plate 302 and the optical film 306. The optical film 306 can be, for example, a light diffuser, a light reflector or a brightness enhancement film, or a combination of two or more thereof which is not limited here. The optical film 306 is disposed between the liquid crystal layer 304 and the backlight module 308. The backlight module 308 may include a PCB circuit board with one or more light sources 310 thereon. The light sources 310 can be, for example, a plurality of LEDs to provide backlight illumination for the liquid crystal layer 304.

The electronic display assembly 3 includes an internal heat exchange path Pin and an external heat dissipation path Pex. The ambient air flow AF flows through the external heat dissipation path Pex. In this embodiment, the internal heat exchange path Pin includes a pathway P1, a pathway P2, a pathway P3 and a pathway P4. The pathway P1 is arranged between the transparent plate 302 and the liquid crystal panel 304. The pathway P2 is arranged between the liquid crystal panel 304 and the optical film 306. The pathway P3 is arranged between the optical film 106 and the backlight module 308. The pathway P4 is arranged directly behind the backlight module 308. The pathways P1, P2, P3 and P4 are fluidly connected with an accommodation space S within the housing 30. That is, an internal air flow (e.g., high temperature air flow HF) is enabled to pass through the accommodation space S and the pathways P1, P2, P3 and P4 of the internal heat exchange path Pin.

The flow generator 42, for example, is a fan disposed in the accommodation space S of the housing 30 and configured to generate an internal air flow flowing through the pathways P1, P2, P3 and P4 and the accommodation space S so as to form an internal circulating airflow.

The electronic display assembly 3 further includes another flow generator 44. The flow generator 44, for example, is a fan for generating an ambient air flow through the external heat dissipation path Pex, so as to bring the heat conducted by the heat exchanger 50 to the environment.

The heat exchanger 50 is disposed in the mounting opening of the rear portion 30s2 of the housing 30. The pathway P4, the external heat dissipation path Pex and the thermal conductive portion 502 together form the heat exchanger 50.

An internal portion of the heat exchanger 50 is disposed in the accommodation space S. The inner side surface of the heat exchanger 50 is attached to the back side of the backlight module 308, such that the backlight module 305 is in thermal contact with the heat exchanger 50. The pathway P4 of the heat exchanger 50 is connected with the accommodation space S, such that the air flow generated by the flow generator 42 in the housing 30 is enabled to pass through the pathway P4 of the heat exchanger 50. An external portion of the heat exchanger 50 protrudes out of the rear portion 30s2 of the housing 30 from the mounting opening, and the external heat dissipation path Pex are fluidly connected with the external environment. In this embodiment, since the housing 30 insulates the pathway P4 from the external environment and a non-connection is provided between the pathway P4 and the external heat dissipation path Pex, the ambient air flow AF is unable to flow into the pathway P4, and the air flow within the housing 30 is unable to flow out to the external heat dissipation path Pex.

The heat exchanger 50 according to this embodiment is favorable for dissipating heat accumulated in the electronic display assembly 3, so as to reduce the temperature within the electronic display assembly 3. Heat accumulated in the electronic display assembly 2 mainly comes from sunlight exposure or the electronic components of the electronic display assembly 3, such as the light sources 310 of the backlight module 308. As shown in FIG. 3, the flow generator 42 generates an air flow flowing through the pathway P4. And, the air flow flows through the accommodation space S within the housing 30 and through the pathways P1, P2 and P3. It is clear from FIG. 3 that the air flow generated by the flow generator 42 forms an internal circulating airflow. In detail, heat generated by the sunlight incident on the transparent plate 302, a liquid crystal layer 304 and/or an optical film 306 can be transferred to the pathways P1 and P2. Additionally, heat generated by the backlight module 308 or other electronic component may be transferred to the pathways P3 and P4.

The ambient air flow AF (such as cold air) flows into the external heat dissipation path Pex of the heat exchanger 50. The high temperature air flow HF in the pathway P4 raises the temperature of the internal portion of the heat exchanger 50, and the ambient air flow AF in the external heat dissipation path Pex reduces the temperature of the external portion of the heat exchanger 50. Therefore, due to the thermal contact between the internal portion and the external portion of the heat exchanger 50 via the thermal conductive portion 502, heat accumulated within the housing 30 of the electronic display assembly 3 is transferred to the external environment through the heat exchanger 50, thereby reduce the temperature of the electronic display assembly 3.

It should be noted that compared with the electronic display assembly 1 shown in FIG. 1 or the electronic display assembly 2 shown in FIG. 2, the heat accumulated in the electronic display assembly 3 can be dissipated more quickly because there are two air pathways (i.e., P1 and P2) on the front and back sides of the liquid crystal layer 104 and two air pathways (i.e., P3 and P4) on the front and back sides of the backlight module 308.

It should be noted that the gap of each of the pathways P1, P2, P3 and P4 in the embodiments of the present disclosure can be properly adjusted based on situational needs such that the internal circulating airflow can flow through the pathways P1, P2, P3 and P4.

Various embodiments of the heat exchanger 50 are illustrated in the following paragraphs.

Figure 4A:
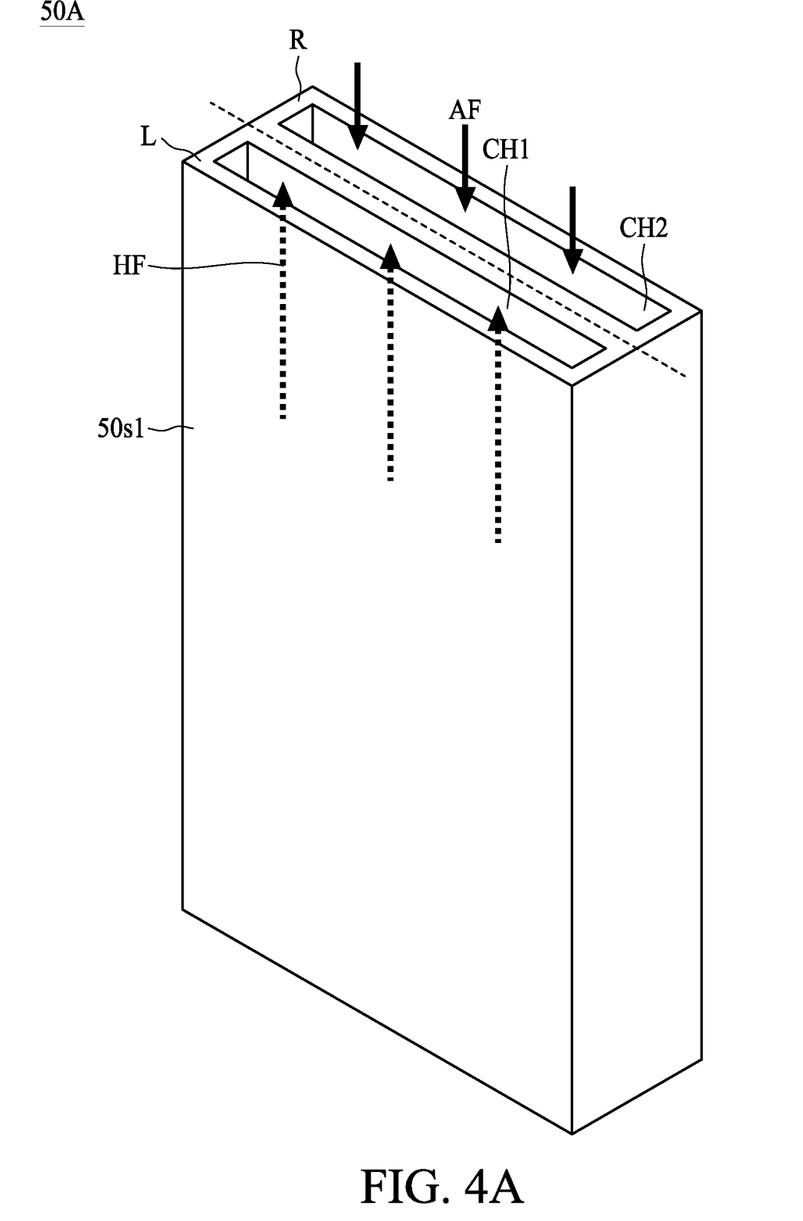
FIG. 4A is a schematic diagram illustrating a heat exchanger according to some embodiments of the present disclosure.

FIG. 4A is a schematic diagram illustrating a heat exchanger according to some embodiments of the present disclosure. Referring to FIG. 4A, a heat exchanger 50A is able to be attached to a backlight module (e.g., the backlight module 20, 20' or 308) of an electronic display assembly (e.g., electronic display assembly 1, 2 or 3) for improving the heat dissipation.

The heat exchanger 50A includes an internal portion L (e.g., the left half portion of the dotted line as shown in FIG. 4A) and an external portion R (e.g., the right half portion of the dotted line as shown in FIG. 4A). The inner side surface 50s1 of the internal portion L of the heat exchanger 50A is configured to be attached to a back side of the backlight module (that is, a surface away from a luminous surface), and the internal portion L has a heat dissipation channel CH1. The heat dissipation channel CH1 is connected with the accommodation space S of the electronic display assembly; that is, a high temperature air flow HF generated by the electronic display assembly is enabled to pass through the accommodation space S and the heat dissipation channel CH1. Moreover, multiple heat sink fins (not shown in the drawings) may be disposed in the heat dissipation channel CH1.

The external portion R of the heat exchanger 50A is in thermal contact with the internal portion L of the heat exchanger 50A. In this embodiment, the external portion R also has a heat dissipation channel CH2. The direction of an internal air flow flowing through the heat dissipation channel CH1 is substantially parallel with the direction of the ambient air flow AF flowing through the heat dissipation channel CH2. The heat dissipation channel CH1 is not in fluid communication with the heat dissipation channel CH2. Specifically, the high temperature air flow HF passing through the heat dissipation channel CH1 does not flow into the heat dissipation channel CH2, and the ambient air flow AF passing through the heat dissipation channel CH2 does not flow into the heat dissipation channel CH1. The heat exchanger 50A, for example, is made of heat-conductive materials (e.g., metallic materials). Therefore, if the temperature in the heat dissipation channel CH1 is higher than that in the heat dissipation channel CH2, the heat will be transferred from the heat dissipation channel CH1 to the heat dissipation channel CH2 through the metal plate between the heat dissipation channels CH1 and CH2.

Figure 4B:
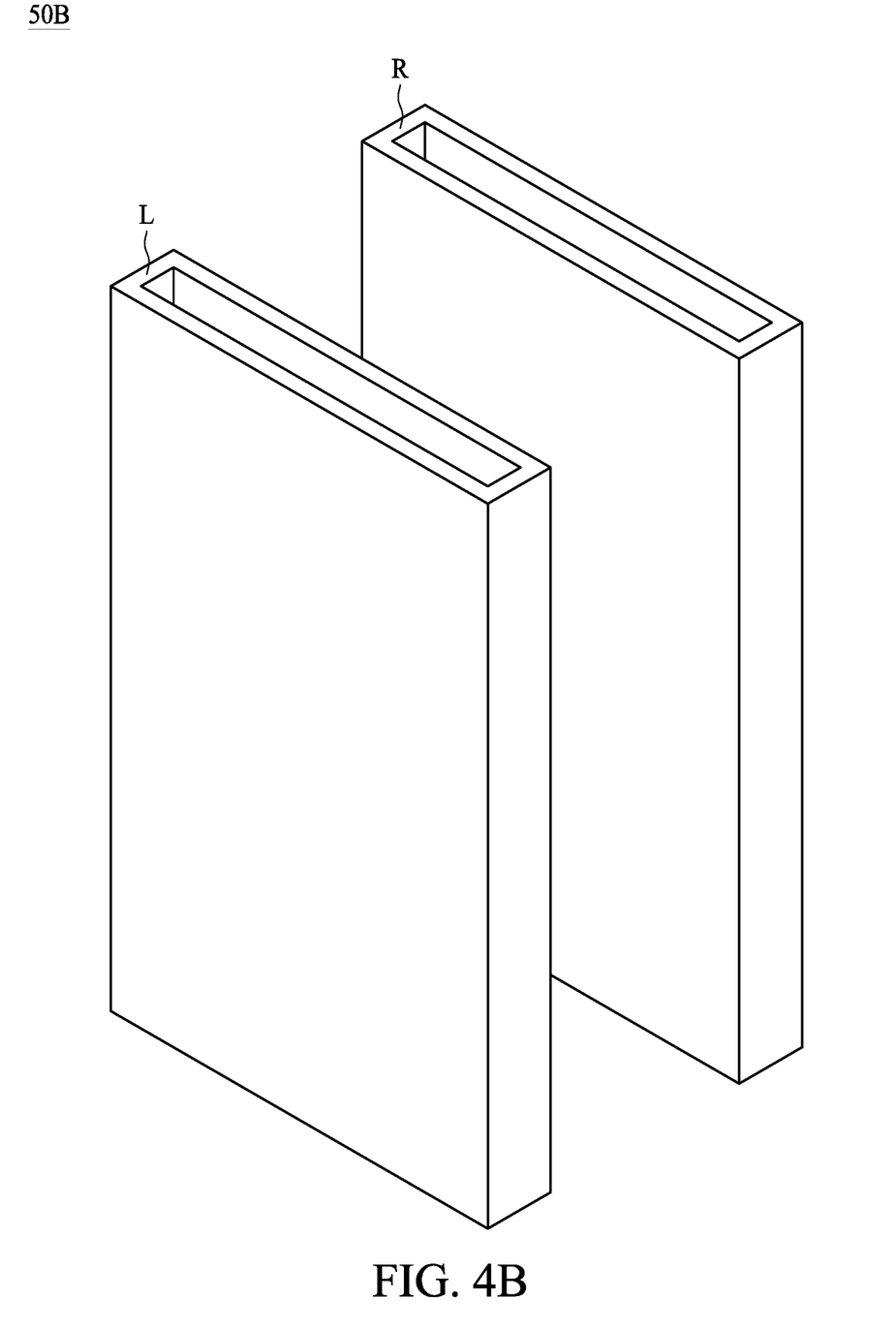
FIG. 4B is a schematic diagram illustrating separated components of a heat exchanger according to some embodiments of the present disclosure.

Referring to FIGS. 1-3 and 4A, the heat exchanger 50A is disposed in the mounting opening of the rear portion 30s2 of the housing 30. Specifically, the internal portion L (e.g., the left half portion of the dotted line as shown in FIG. 4A) of the heat exchanger 50A is disposed in the accommodation space S within the housing 30 of the electronic display assembly 1, 2 or 3. The external portion R (e.g., the right half portion of the dotted line as shown in FIG. 4A) of the heat exchanger 50A protrudes out of the rear portion 30s2 of the housing 30 from the mounting opening. In this embodiment, the heat exchanger 50A is an integrated single piece. Thus, it is favorable for an easier manufacturing of the heat exchanger 50A so as to reduce cost and ensure a proper thermal contact between the internal portion L and the external portion R. It should be noted that an integrated heat exchanger 50A is not limited in view of embodiments in the present disclosure. FIG. 4B is a schematic diagram illustrating separated components of a heat exchanger 50B according to some embodiments of the present disclosure. Referring to FIG. 4B, the internal portion L and the external portion R are separated components which can be assembled together to form the heat exchanger. The internal portion L and the external portion R can be attached to each other using any appropriate bonding technique with thermal conductive materials.

Figure 5:
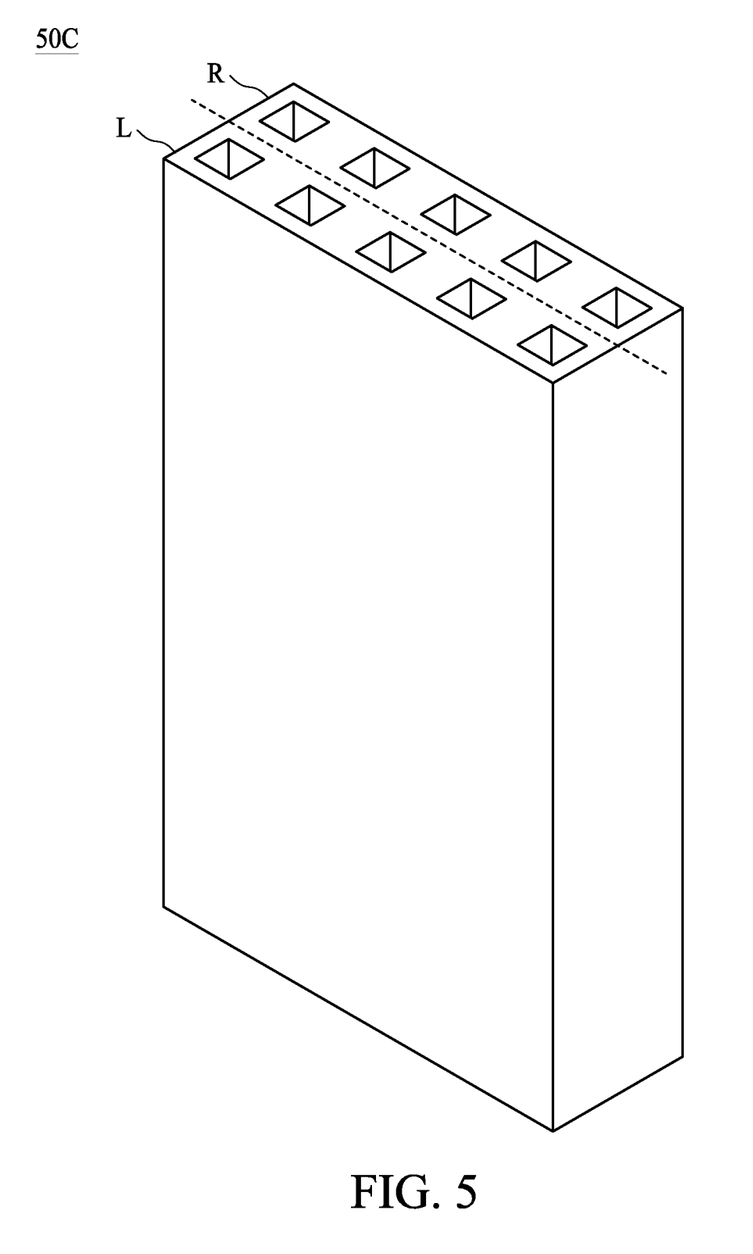
FIG. 5 is a schematic diagram illustrating a heat exchanger according to some embodiments of the present disclosure.

FIG. 5 is a schematic diagram illustrating a heat exchanger according to some embodiments of the present disclosure. Referring to FIG. 5, a heat exchanger 50C is able to be attached to a backlight module (e.g., the backlight module 20, 20' or 308) of an electronic display assembly (e.g., electronic display assembly 1, 2 or 3) for improving the heat dissipation. The heat exchanger 50B includes an internal portion L (e.g., the left half portion of the dotted line as shown in FIG. 5) and an external portion R (e.g., the right half portion of the dotted line as shown in FIG. 5).

The heat exchanger 50C of FIG. 5 is similar to the heat exchanger 50A of FIG. 4A; one difference between them lies in the number of the heat dissipation channels. Specifically, the internal portion L of the heat exchanger 50C has a plurality of heat dissipation channels. In this embodiment, the internal portion L of the heat exchanger 50C has five heat dissipation channels. Similarly, the external portion R of the heat exchanger 50C also has a plurality of heat dissipation channels. In this embodiment, the external portion R of the heat exchanger 50C also has five heat dissipation channels. The direction of the internal air flows flowing through the heat dissipation channels of the internal portion L is substantially parallel with the direction of the ambient air flows AF flowing through the heat dissipation channels of the external portion R. It should be noted that if the total dissipation area of inner walls of the heat dissipation channels of the internal portion L and external portion R of the heat exchanger 50C is larger than that of the heat dissipation channels CH1 and CH2 of the heat exchanger 50A, then the heat exchanger 50C shown in FIG. 5 has better heat dissipation effect than the heat exchanger 50A shown in FIG. 4A.

It should be noted that the numbers of the heat dissipation channels of the external portion R and the internal portion L can be determined based on situational needs and thus not limited in the present disclosure. Additionally, the number of the heat dissipation channels of the external portion R can be the same as or different from the number of the heat dissipation channels of the internal portion L.

Furthermore, in the embodiments of the present disclosure, a cross sectional area of each heat dissipation channel of the internal portion L and a cross sectional area of each heat dissipation channel of the external portion R are both rectangular. It should be noted that the shape of the cross sectional area of each heat dissipation channel can be, for example, square, rectangular, circle, oval, etc., which is not limited in the present disclosure.

Figure 6:
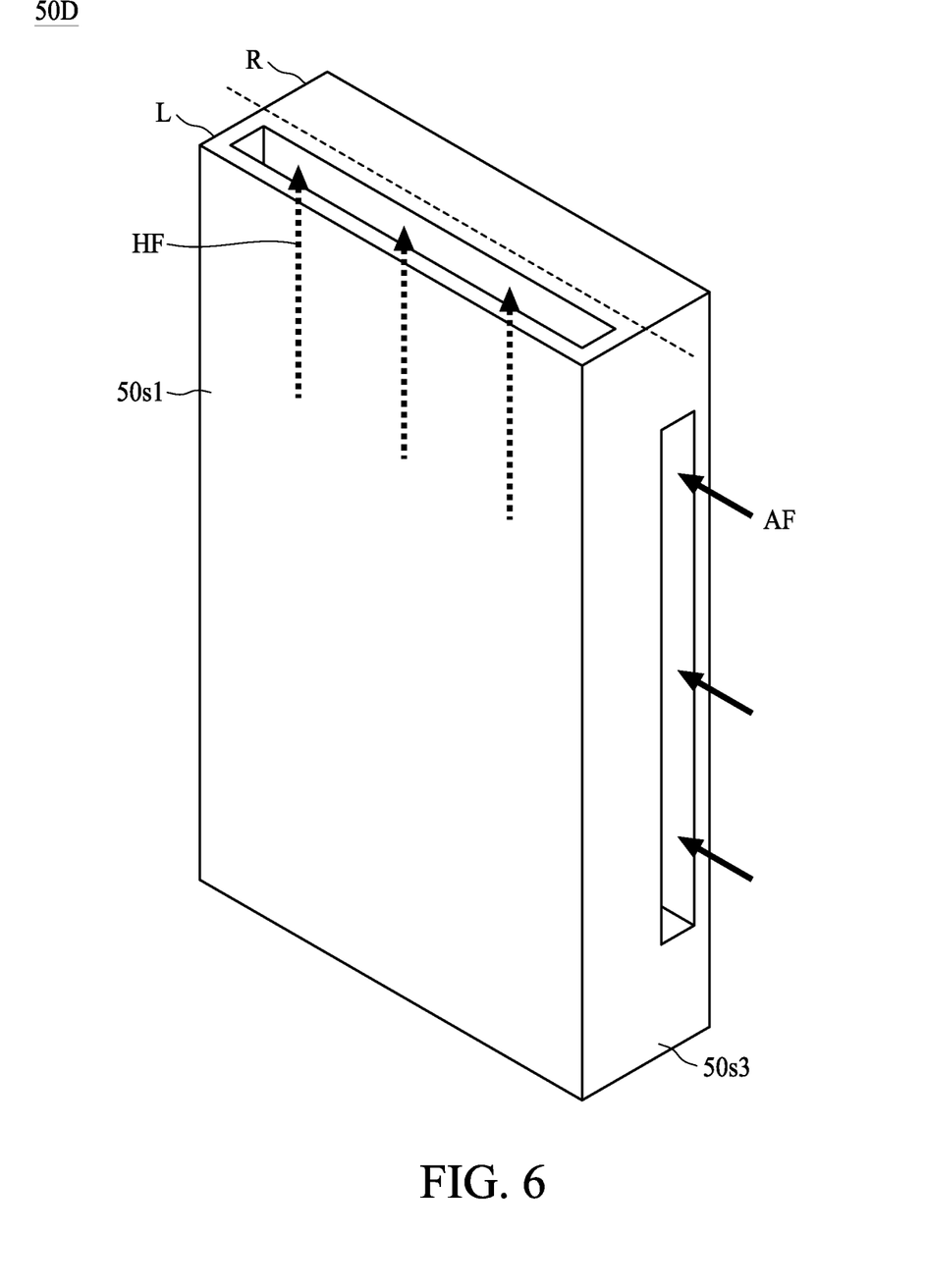
FIG. 6 is a schematic diagram illustrating a heat exchanger according to some embodiments of the present disclosure.

FIG. 6 is a schematic diagram illustrating a heat exchanger according to some embodiments of the present disclosure. Referring to FIG. 6, a heat exchanger 50D is able to be attached to a backlight module (e.g., the backlight module 20, 20' or 308) of an electronic display assembly (e.g., electronic display assembly 1, 2 or 3) for improving the heat dissipation. The heat exchanger 50D includes an internal portion L (e.g., the left half portion of the dotted line as shown in FIG. 6) and an external portion R (e.g., the right half portion of the dotted line as shown in FIG. 6).

The heat exchanger 50D of FIG. 6 is similar to the heat exchanger 50A of FIG. 4A; one difference between them lies in the direction of the opening of the heat dissipation channel of the external portion R. Specifically, the direction of an internal air flow flowing through the heat dissipation channel CH1 of the internal portion L is substantially perpendicular to the direction of the ambient air flow AF flowing through the heat dissipation channel CH2' of the external portion R.

Figure 7:
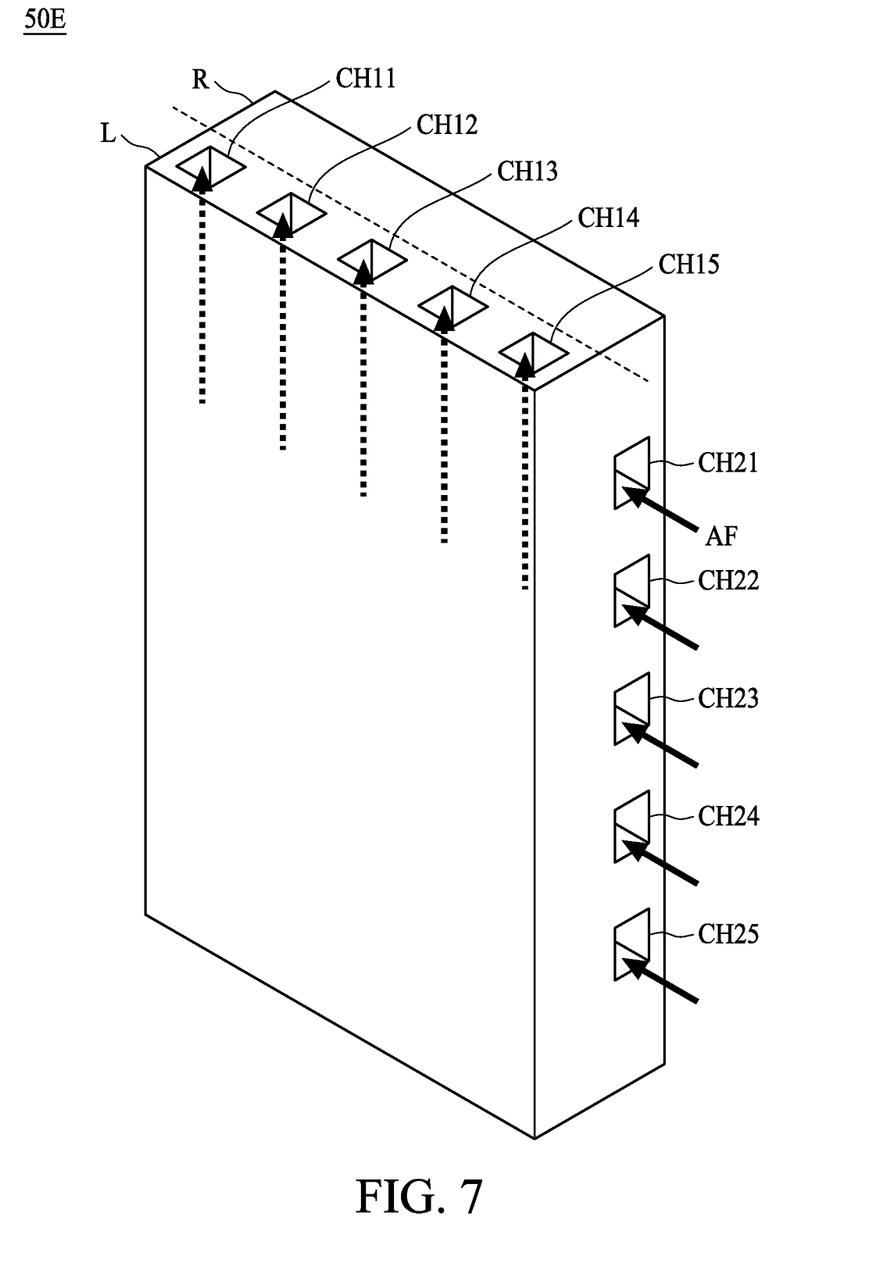
FIG. 7 is a schematic diagram illustrating a heat exchanger according to some embodiments of the present disclosure.

FIG. 7 is a schematic diagram illustrating a heat exchanger according to some embodiments of the present disclosure. Referring to FIG. 7, a heat exchanger 50E is able to be attached to a backlight module (e.g., the backlight module 20, 20' or 308) of an electronic display assembly (e.g., electronic display assembly 1, 2 or 3) for improving the heat dissipation. The heat exchanger 50E includes an internal portion L (e.g., the left half portion of the dotted line as shown in FIG. 7) and an external portion R (e.g., the right half portion of the dotted line as shown in FIG. 7).

The heat exchanger 50E of FIG. 7 is similar to the heat exchanger 50D of FIG. 6; one difference between them lies in the number of the heat dissipation channels. Specifically, the internal portion L of the heat exchanger 50E has a plurality of heat dissipation channels. In this embodiment, the internal portion L of the heat exchanger 50E has five heat dissipation channels. Similarly, the external portion R of the heat exchanger 50E also has a plurality of heat dissipation channels. In this embodiment, the external portion R of the heat exchanger 50E also has five heat dissipation channels. The direction of the multiple internal air flows flowing through the heat dissipation channels of the internal portion L is substantially perpendicular to the direction of the multiple ambient air flows AF flowing through the heat dissipation channels of the external portion R. It should be noted that if the total dissipation area of inner walls of the heat dissipation channels of the internal portion L and external portion R of the heat exchanger 50E is larger than that of the heat dissipation channels CH1 and CH2 of the heat exchanger 50D, then the heat exchanger 50E shown in FIG. 7 has better heat dissipation effect than the heat exchanger 50D shown in FIG. 6.

It should be noted that the performance of heat dissipation of the heat varies depending on the orientation of the heat dissipation channels. Please refer to FIG. 7, the ambient air at the entrances of the channels CH21, CH22, CH23, CH24 and CH25 is cooler that the ambient air at the exits of the channels CH21, CH22, CH23, CH24 and CH25. Therefore, the heat carried by the air in CH15 dissipated faster that the heat carried by the air in CH11. It is because the temperature difference between the air in CH15 and that around the entrances of the channels CH21, CH22, CH23, CH24 and CH25 is much higher than the temperature difference between the air in CH11 and that around the exits of the channels CH21, CH22, CH23, CH24 and CH25. In view of the above, the heat exchanger 50C may have better performance in heat dissipation than that of the heat exchanger 50E; and the heat exchanger 50A may have better performance in heat dissipation than that of the heat exchanger 50C.

Figure 8:
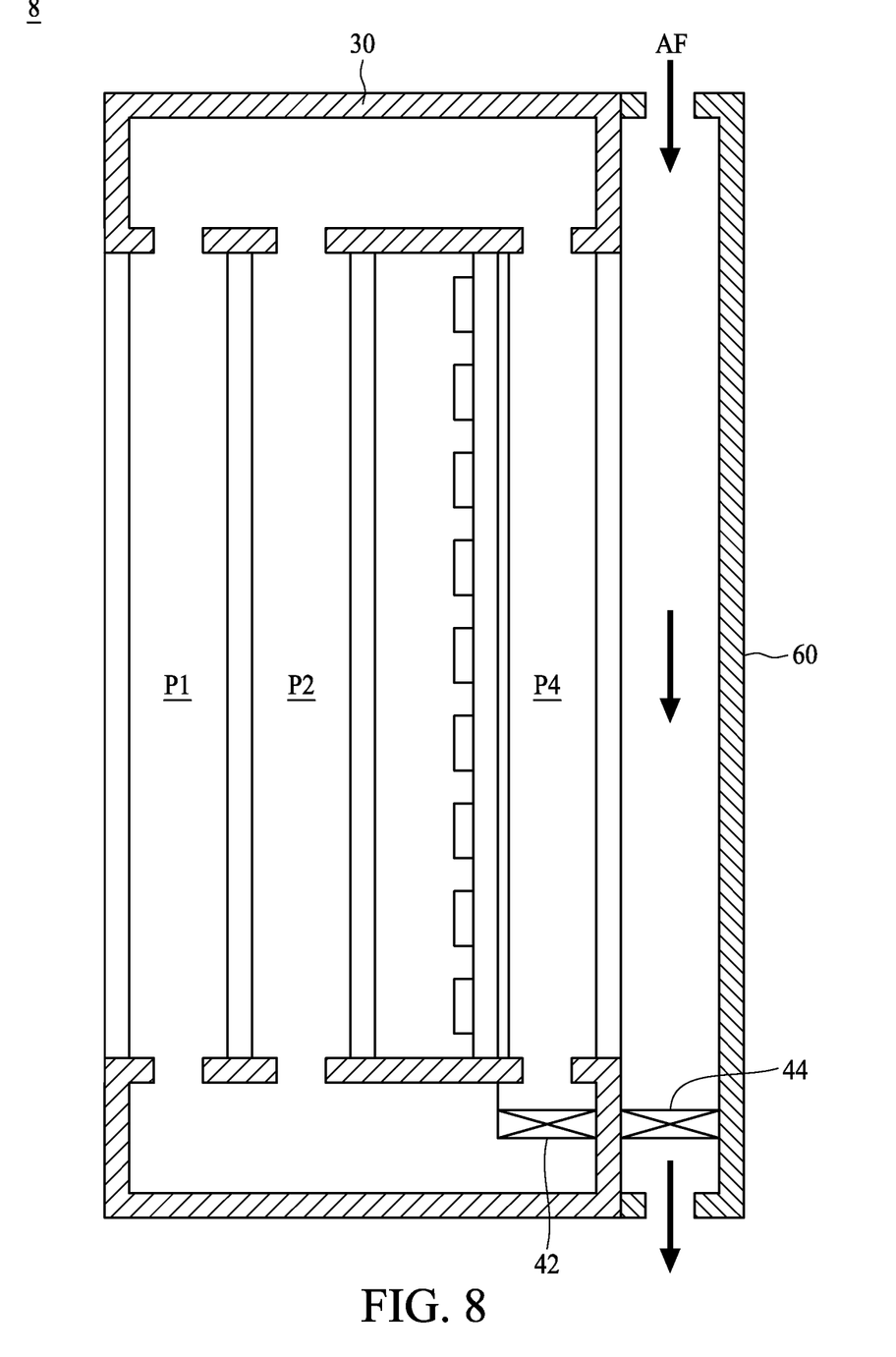
FIG. 8 is a cross-sectional view of an electronic display assembly according to some embodiments of the present disclosure.

FIG. 8 is a cross-sectional view of an electronic display assembly according to some embodiments of the present disclosure. The electronic display assembly 8 of FIG. 8 is similar to the electronic display assembly 1 of FIG. 1; only differences will be described hereafter.

The electronic display assembly 8 includes a cover 60. The external heat dissipation path Pex is within the cover 60. The flow generator 42 is disposed in the housing 30. The flow generator 44 is disposed outside of the housing 30 and within the cover 60, and the flow generator 44 correspond to the external heat dissipation path Pex of the heat exchanger. The flow generator 42 is configured to bring the high temperature air flow HF in the housing 30 into the pathway P4. The flow generator 44 is configured to bring ambient air flow AF into the external heat dissipation path Pex.

Since the flow generator 44 forces air movement to create ambient air flow AF, it is favorable for enhancing heat exchange efficiency between the pathway P4 and the external heat dissipation path Pex. Also, since the cover 60 covers the external heat dissipation path Pex protruding from the housing 30, it is favorable for an attractive appearance of the electronic display assembly 1.

As used herein, the singular terms "a," "an," and "the" may include plural referents unless the context clearly indicates otherwise. For example, reference to an electronic device may include multiple electronic devices unless the context clearly indicates otherwise.

As used herein, the terms "connect," "connected" and "connection" refer to an operational coupling or linking. Connected components can be directly or indirectly coupled to one another through, for example, another set of components.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless otherwise specifically indicated herein, the order and grouping of the operations are not limitations of the present disclosure.

What is claimed is:

1. An electronic display assembly comprising:
    a backlight module;
    a transparent plate;
    a liquid crystal panel, disposed behind the transparent plate;
    an optical film, disposed between the liquid crystal panel and the backlight module;
    an internal heat exchange path, comprising:
        a first pathway arranged between the transparent plate and the liquid crystal panel;
        a second pathway arranged between the liquid crystal panel and the optical film;
        a third pathway arranged between the optical film and the backlight module;
        a fourth pathway located directly behind the backlight module,
        wherein the direction of an internal air flow flowing through the first, second and third pathways is the same and parallel to each other; and
    an external heat dissipation path with ambient air flowing through, wherein the external heat dissipation path carries heat conducted from air flowing through the fourth pathway.

2. The electronic display assembly of claim 1, wherein the fourth pathway and the external heat dissipation path together form a heat exchanger with at least two channels.

3. The electronic display assembly of claim 2, the heat exchanger further comprising a plurality of external heat dissipation paths and a plurality of fourth pathways.

4. The electronic display assembly of claim 2, wherein the direction of the internal air flow flowing through the fourth pathway is substantially perpendicular to the direction of the ambient air flow flowing through the external heat dissipation path.

5. The electronic display assembly of claim 1, wherein the direction of the internal air flow flowing through the fourth pathway is substantially parallel with the direction of the ambient air flow flowing through the external heat dissipation path.

6. The electronic display assembly of claim 1, further comprising a housing, wherein the external heat dissipation path is outside of the housing.

7. The electronic display assembly of claim 6, further comprising a cover, wherein the external heat dissipation path is within the cover.

8. The electronic display assembly of claim 7, wherein the cover has an opening such that the ambient air flow is enabled to pass through the external heat dissipation path via the opening.

9. The electronic display assembly of claim 1, further comprising a flow generator configured to generate the internal air flow flowing through the fourth pathway.

10. The electronic display assembly of claim 9, wherein the flow generator is disposed on the periphery of the third pathway.

11. The electronic display assembly of claim 1, wherein the direction of the internal air flow flowing through the first, second and third pathways is opposite to the direction of the internal air flow flowing through the fourth pathway.

* * * * *